(12) United States Patent
Taylor, Jr. et al.

(10) Patent No.: US 6,825,793 B2
(45) Date of Patent: Nov. 30, 2004

(54) SYSTEM AND METHOD FOR DETECTING AND LOCATING UNDERGROUND OBJECTS

(75) Inventors: David W. A. Taylor, Jr., Greensboro, NC (US); Alan G. R. Bell, Alexandria, VA (US)

(73) Assignee: ENSCO, Inc., Falls Church, VA (US)

(*) Notice: Subject to any disclaimer, the term of this patent is extended or adjusted under 35 U.S.C. 154(b) by 0 days.

(21) Appl. No.: 10/373,095

(22) Filed: Feb. 26, 2003

(65) Prior Publication Data

US 2003/0164789 A1 Sep. 4, 2003

Related U.S. Application Data

(60) Provisional application No. 60/361,044, filed on Mar. 1, 2002.

(51) Int. Cl.[7] .............................. G01S 13/00; G01V 3/10
(52) U.S. Cl. ........................................ 342/22; 324/329
(58) Field of Search ...................... 342/22, 27; 324/337, 324/326, 329

(56) References Cited

U.S. PATENT DOCUMENTS

| | | | |
|---|---|---|---|
| 3,651,395 A | * 3/1972 | Owen et al. | ................. 324/337 |
| 4,924,450 A | * 5/1990 | Brashear et al. | ............ 367/118 |
| 4,951,055 A | 8/1990 | Katayama | |
| 5,001,430 A | 3/1991 | Peterman et al. | |
| 5,093,622 A | 3/1992 | Balkman | |
| 5,294,937 A | 3/1994 | Ostteen et al. | |
| 5,361,029 A | 11/1994 | Rider et al. | |
| 5,471,143 A | 11/1995 | Doany | |
| 5,541,516 A | 7/1996 | Rider et al. | |
| 5,570,028 A | 10/1996 | Sperlazzo et al. | |
| 5,576,973 A | 11/1996 | Haddy | |
| 5,629,626 A | 5/1997 | Russell et al. | |
| 5,640,092 A | 6/1997 | Motazed et al. | |
| 5,644,314 A | 7/1997 | Ahmad et al. | |
| 5,680,048 A | 10/1997 | Wollny | |
| 5,711,381 A | 1/1998 | Archambeault et al. | |
| 5,819,859 A | 10/1998 | Stump et al. | |
| 5,949,373 A | 9/1999 | Eslambolchi et al. | |
| 6,026,135 A | 2/2000 | McFee et al. | |
| 6,053,260 A | 4/2000 | Boon et al. | |

(List continued on next page.)

OTHER PUBLICATIONS

U.S. patent application Ser. No. 10/095,110, filed: Mar. 12, 2002, David W.A. Taylor, et al.; "Method and apparatus for Detecting, Mapping and Locating Underground Utilities" (Specification, Claims, Drawings and Amendment filed Mar. 2, 2004).

*Primary Examiner*—Bernarr E. Gregory
*Assistant Examiner*—Brian Andrea
(74) *Attorney, Agent, or Firm*—Jeffrey L. Costellia; Nixon Peabody LLP

(57) ABSTRACT

A system for detecting and locating an underground object having stationary RF transmitter receivers that define a coordinate system for an area of interest, a sensor adapted to detect presence of an underground object and to provide a presence data, and a mobile RF transmitter receiver that is movable with the sensor, and is adapted to receive and/or transmit location data indicative of location of the mobile transmitter receiver in the coordinate system. A method is also provided for detecting and locating underground object including the steps of establishing a coordinate system for an area of interest, detecting presence of an underground object and providing a presence data upon detection of the underground object, and transmitting and/or receiving location data in a radio frequency, the location data being indicative of location of the underground object in the established coordinate system.

34 Claims, 2 Drawing Sheets

U.S. PATENT DOCUMENTS

| | | |
|---|---|---|
| 6,067,039 A | 5/2000 | Pyner et al. |
| 6,082,466 A | 7/2000 | Gudat |
| 6,091,715 A | 7/2000 | Vucetic et al. |
| 6,125,326 A | 9/2000 | Ohmura et al. |
| 6,211,807 B1 | 4/2001 | Wilkison |
| 6,501,414 B2 * | 12/2002 | Arndt et al. .................. 342/22 |
| 6,609,451 B1 * | 8/2003 | Inoue et al. ................. 89/1.13 |
| 6,670,906 B1 * | 12/2003 | Roberts et al. ............... 342/22 |

* cited by examiner

SYSTEM AND METHOD FOR DETECTING AND LOCATING UNDERGROUND OBJECTS

RELATED APPLICATIONS

This application claims priority from provisional patent application Ser. No. 60/361,044, filed on Mar. 1, 2002, incorporated herein by reference.

BACKGROUND OF THE INVENTION

1. Field of the Invention

The present invention is directed to a system and method for detecting and locating underground objects such as gas, electric, telephone, water utilities, etc. In particular, the present invention provides such a system and method that includes a sensor and positioned RF transmitter receivers that allow determination of the locations of underground objects.

2. Description of the Related Art

Conventional practice for locating underground objects such as underground utilities is a manual, audio technique where a technician uses a hand-held sensor with audio feedback. In the example of underground utilities, the technician first places the sensor at a location where the target utility is assumed to be located. The technician then manually searches for the presence of the underground utility using the sensor based on the audio feedback. Once a portion of the underground utility is found, the technician utilizes the sensor to track the location of the utility, again, based upon the audio feedback of the sensor. The technician then makes paint marks on the ground over the underground utility so that this location can be subsequently mapped and be used by an excavator to identify the expected location of the utility.

In more recent cable locating methods, the operator uses a conventional cable locator to find a cable as described above. However, instead of using paint to mark the location of the cable, a Global Positioning System (hereinafter "GPS") is used to obtain GPS data that marks the location of the cable. In such systems, the technician manually locates a cable sensor over the cable in a manner similar to the conventional practice described above. Then, as the technician manually tracks the cable using the cable locator, he/she periodically marks the location of the cable locator using the GPS system to thereby record the cable location. This technique is disclosed in U.S. Pat. No. 5,576,973 to Haddy.

SUMMARY OF THE INVENTION

The technique for locating cables using GPS as disclosed in the Haddy patent has various limitations. In particular, GPS data alone may not be sufficiently accurate in many instances to track a small underground objects and utilities, such as a cable, without additional locating data. At the time of the Haddy patent, the typical accuracy obtainable using a commercially available GPS receiver was between approximately 20–100 meters. This is far too inaccurate to allow effective use in locating an underground cable, especially when the sensor used to locate the underground cable must be moved about in search for the underground cable.

Recently, commercial GPS systems have increased in accuracy. However, their accuracy is still too limited for use with a sensor that is moved about in search of underground objects. In particular, GPS satellites in orbit thousands of miles above the earth broadcast data to a GPS receiver which determines its location in terms of latitude and longitude by calculating the distance to the transmitting satellites. Hence despite improvements to commercial GPS systems, in areas where a clear line of sight to the sky is not available such as in a city with tall buildings, or in more rural areas with tall trees, errors resulting from a GPS based system increases.

Therefore, there still exists a need for a system that can more accurately detect and locate underground objects such as underground utilities, when compared to available GPS based systems.

In addition, there still exists a need for such a system for detecting and locating underground objects in a cost effective manner.

Furthermore, there still exists a need for such a system that is not inhibited by tall buildings or tall trees.

Moreover, there still exists a need for a method for more accurately detecting and locating underground objects.

These and other advantages are attained by a system for detecting and locating an underground object in accordance with one embodiment of the present invention comprising a plurality of stationary transmitter receivers operating in a radio frequency, the plurality of stationary transmitter receivers defining a coordinate system for an area of interest, a sensor adapted to detect of an underground object and to provide presence data upon detection of the underground object, and a mobile transmitter receiver operating in a radio frequency, the mobile transmitter receiver being movable with the sensor and adapted to receive and/or transmit location data indicative of location of the mobile transmitter receiver in the coordinate system.

In accordance with another embodiment, the system also includes a data logger adapted to record the presence data and/or the location data. The data logger may be integral with the mobile transmitter receiver. In accordance with one embodiment, the location data is indicative of distance between the mobile transmitter receiver and at least one of the plurality of stationary transmitter receivers.

In accordance with still another embodiment, the system further comprises a processor unit adapted to store and process the presence data and/or the location data to generate a mapping of the underground object in the coordinate system. In addition, the processor unit also includes a display device for displaying the generated mapping of the underground object. In one implementation, the processor unit is connected to the mobile transmitter receiver and/or one of the plurality of stationary transmitter receivers and is implemented as a hand held computer.

The sensor may be an electromagnetic, a magnetic, or a radio detection sensor, and the underground object may be an underground utility such as gas, electric, telephone, fiber optics, cable, water, and/or sewage utility. The radio frequency may be in a range between 900 MHz to 5.8 GHz. In this regard, in another embodiment, the mobile transmitter receiver and/or the stationary transmitter receivers include a spread spectrum radio circuit having a data processing circuit adapted to determine propagation times of the location data. In one implementation, the data processing circuit is further adapted to determine distance between the mobile transmitter receiver and at least one of the plurality of stationary transmitter receiver based on the propagation times.

In accordance with another aspect of the present invention, a method for detecting and locating an underground object is provided including the steps of establishing a coordinate system for an area of interest, detecting an underground object and providing presence data upon detection of the underground object, and transmitting and/or receiving location data in a radio frequency, the location data being indicative of location of the underground object in the established coordinate system. In one embodiment, the step of establishing a coordinate system includes the step of arranging a plurality of stationary transmitter receivers operating in a radio frequency proximate to the area of interest.

In accordance with one embodiment, the established coordinate system is a relative coordinate system. In this regard, the method may further include the step of fixing the relative coordinate system to a fixed object in the area of interest to establish a fixed coordinate system. Alternatively, the method may include the step of fixing the relative coordinate system by determining global position of at least one of the plurality of stationary transmitter receivers. The underground object may be detected using a sensor which is preferably electromagnetic, magnetic, radio frequency, radiation, metal, and/or chemical detection sensor.

In another embodiment, the method further includes the step of moving a mobile transmitter receiver to location where the underground object is detected. The location data is indicative of distance between the mobile transmitter receiver and at least one of the plurality of stationary transmitter receivers. Alternatively, the method includes the steps of determining propagation times of the location data, and determining distance between at least one of the plurality of stationary transmitter receivers and the mobile transmitter receiver based on the propagation times.

The method may also include the step of processing the presence data and/or the location data to generate and display a mapping of the underground object in the coordinate system. The method may further include the step of recording the presence data and/or the location data.

In still another embodiment, the method further includes the step of moving the plurality of stationary transmitter receivers to an adjacent area that is adjacent to the area of interest, and establishing an adjacent coordinate system for the adjacent area. In this regard, the method of this embodiment also includes the steps of detecting the presence of an adjacent underground object in the adjacent area and providing adjacent presence data upon detection of the adjacent underground object. Moreover, the method further includes the step of at least one of transmitting and receiving adjacent location data in a radio frequency, the adjacent location data being indicative of location of the adjacent underground object in the established adjacent coordinate system.

These and other objects, features and advantages of the present invention will become more apparent from the following detailed description of the preferred embodiments of the present invention when viewed in conjunction with the accompanying drawings.

DETAILED DESCRIPTION OF THE INVENTION

Figure 1:
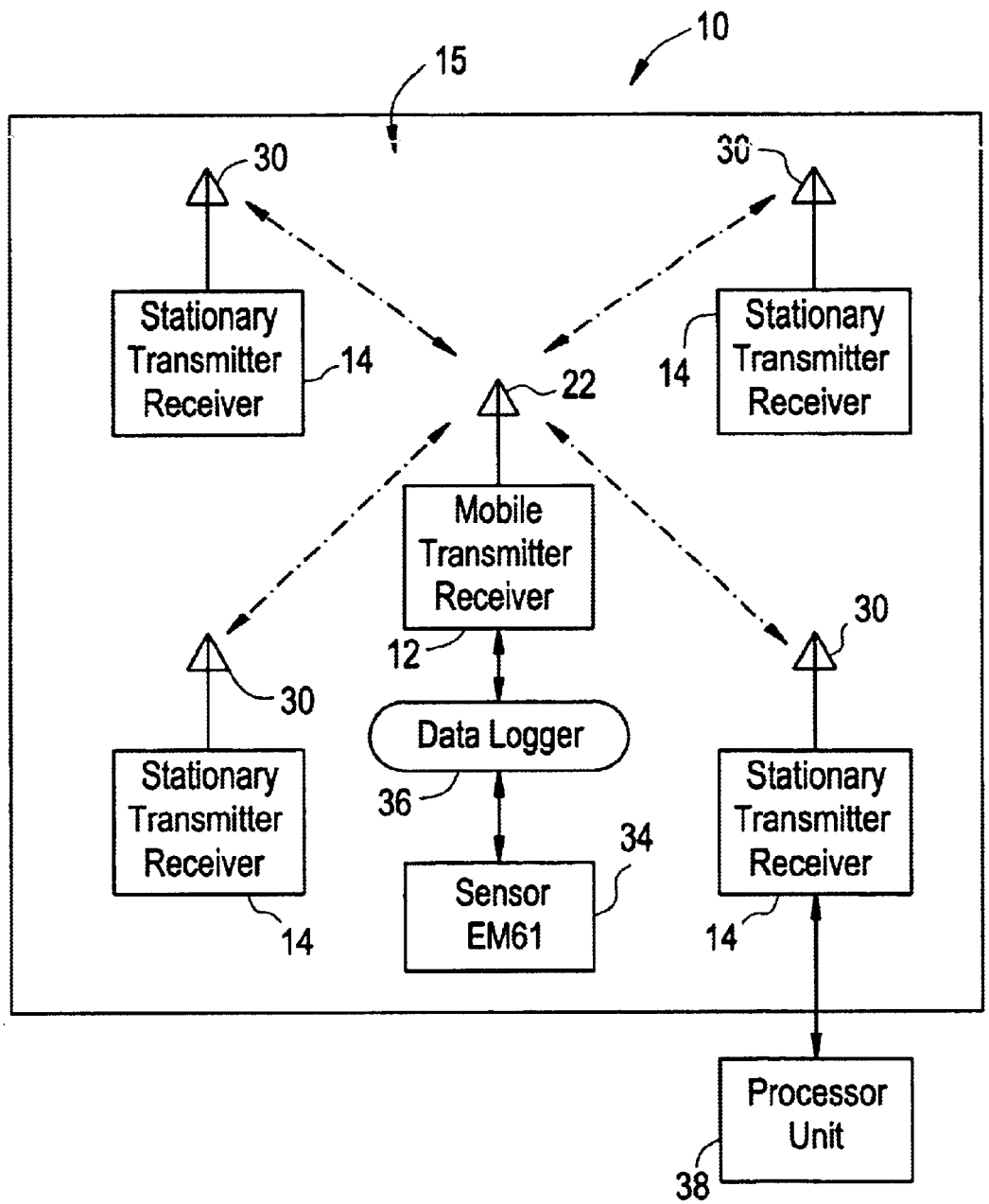
FIG. 1 is a block diagram of the system for detecting and locating underground objects in accordance with one embodiment of the present invention.

FIG. 1 is a block diagram of the system 10 for detecting and locating underground objects in accordance with one embodiment of the present invention. As described in detail below, the system 10 as shown in FIG. 1 preferably uses spread spectrum radio frequency technology to detect and locate underground objects such as underground utilities with enhanced accuracy unattainable with conventional cable locating systems that solely utilize GPS technology. In particular, the system 10 includes a plurality of stationary transmitter receivers 14 that are positioned in spaced relationship in an area of interest 15. Each of the plurality of stationary transmitter receivers 14 are provided with antennas 30 to allow transmitting and/or receiving of data described in further detail below. The plurality of stationary transmitter receivers 14 are positioned relative to each other with distances between the stationary transmitter receivers 14 known so as to establish a local coordinate system of the area of interest 15.

The area of interest 15 referred to herein is the area of neighborhood, ground, street, or any other surface under which the underground object or objects may be present. In this regard, the object may be one or more underground utilities associated with gas, electric, telephone, fiber optics, cable, water, sewage, or other utilities. Of course, other underground objects may be detected and located using the system 10 as well. However, it will be evident from the discussion below that the present system 10 may be advantageously used to detect and locate such underground utilities that extend through an area of interest. It should also be noted that the plurality of stationary transmitter receivers 14 are "stationary" in the sense that their position are not changed when the system 10 is being used to detect and locate underground objects in the area of interest 15. However, the plurality of stationary transmitter receivers 14 are preferably implemented as portable devices that can be moved to a different area to allow detection and location of underground objects in a different area of interest, for example, an adjacent area next to area of interest 15. Moreover, whereas in the example embodiment of FIG. 1 the system 10 is provided with a total of four stationary transmitter receivers 14, a different number of stationary transmitter receivers 14 may be provided in other implementations. For instance, two, three, or more than four stationary transmitter receivers 14 may be used instead. Of course, as more stationary transmitter receivers are provided, the system 10 can more accurately locate the underground object. However, three or four stationary transmitter receivers have been found to be sufficient to enable accurate locating of underground objects while minimizing the cost of system 10.

In the present example, the system 10 includes a sensor 34 adapted to provide presence data upon detecting the presence of an underground object. The sensor 34, for example, may be Geonics EM 61 electromagnetic sensor as shown. However, the underground sensor 34 could include other sensors adaptable for use in detecting underground objects such as electromagnetic, magnetic, radio frequency, radiation, metal, chemical detection sensors, or the like, depending on the underground object being located. The presence data may be an auditory or visual signal indicating detection of the underground object by the sensor 34. Of course, the presence data may be any appropriate signal or information for indicating the presence of the underground object.

The system 10 also includes a mobile transmitter receiver 12 adapted to be moved within, or proximate to, the area of interest 15. The mobile transmitter receiver 12 is further adapted to transmit and/or receive location data indicative of the position of the mobile transmitter receiver 12 in the coordinate system established by the plurality of stationary transmitter receivers 14. In this regard, the mobile transmitter receiver 12 is provided with an antenna 22 to transmit data to, and/or receive data from, one or more of the stationary transmitter receivers 14. The stationary transmitter receiver 14 and the mobile transmitter receiver 12 may be positioned to provide clear line-of-sight propagation paths throughout the area of interest 15. The mobile transmitter receiver 12 also may be implemented as a hand held unit sized to facilitate its positioning and movement within, or proximate to, the area of interest 15.

In accordance with one embodiment, the mobile transmitter receiver 12 is moved in conjunction with the underground sensor 34 so that the location of the sensor 34 can be readily determined when the sensor 34 provides the presence data indicating the presence of an underground object. The system 10 of the illustrated embodiment also includes a data logger 36 that interfaces with the mobile transmitter receiver 12 and the sensor 34. The data logger 36 is adapted to store the data from the sensor 34 and/or the mobile transmitter receiver 12, and optionally, to provide the stored data to the mobile transmitter receiver 12 for transmission to one or more stationary transmitter receivers 14.

In the present embodiment, at least one of the stationary transmitter receivers 14 is connected to a processor unit 38 which is adapted to process the presence data and/or location data, and to generate a mapping of the underground object in the area of interest 15. This generated mapping may be displayed in a display of the processor unit 38, the map being based upon data from the plurality of stationary transmitter receivers 14 and the mobile transmitter receiver 12. In the above regard, the processor unit 38 may be implemented as a computer or other computing device such as a laptop or hand held computer. It should also be noted that in alternative embodiments of the present invention, the processor unit 38 may be provided directly on the mobile transmitter receiver 12 instead of being connected to one of the plurality of stationary transmitter receivers 14. In such an embodiment, the portability of the mobile transmitter receiver 12 may be maintained by implementing the processor unit 38 as a hand held computer, or by providing a device that integrates the functions of both the mobile transmitter receiver 12 and the processor unit 38.

Figure 2:
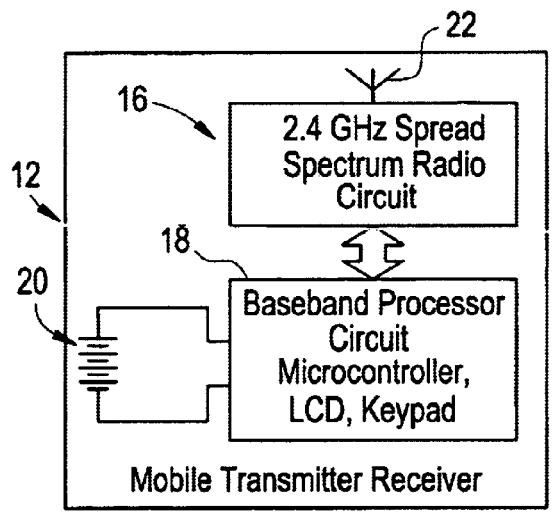
FIG. 2 is a schematic diagram of one embodiment of the mobile transmitter receiver of FIG. 1.
Figure 3:
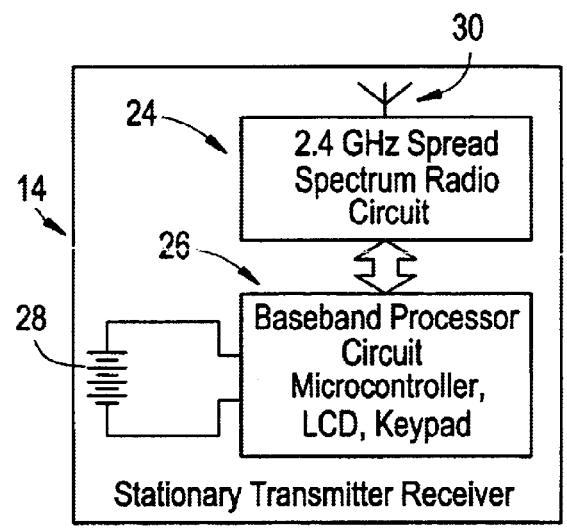
FIG. 3 is a schematic diagram of one embodiment of the stationary transmitter receiver of FIG. 1.

FIGS. 2 and 3 show block diagrams of the mobile transmitter receiver 12 and one of the plurality of stationary transmitter receivers 14, respectively, in accordance with one embodiment of the present invention. As shown in FIG. 2, the illustrated embodiment of the mobile transmitter receiver 12 includes a spread spectrum radio circuit 16 that is connected to the antenna 22 for receiving and transmitting data using radio frequencies. In this regard, the radio frequency may be in a range between 900 MHz to 5.8 GHz. Of course, other radio frequencies may also be used, subject to governmental regulations. As shown, the radio frequency used by the system 10 of the present embodiment is 2.4 GHz.

The radio circuit 16 interfaces with a processing circuit 18 for processing received data from one or more stationary transmitter receivers 14, or for preparing data to be transmitted to one or more stationary transmitter receivers 14. The data processing circuit 18 may also be provided with a key pad and an LCD display for interfacing with the user of the mobile transmitter receiver 12. By using the keypad of the data processing circuit 18, the user of the system 10 can control transmission of data to the processor unit 38 via the stationary transmitter receiver 14 connected thereto. In addition, the mobile transmitter receiver 12 may also include a power supply 20, for example, in the form of a battery(s), to enhance mobility of the mobile transmitter receiver 12. Of course, in other embodiments, the power supply 28 need not be a battery.

In the illustrated embodiment of FIG. 3, the stationary transmitter receivers 14 are configured substantially the same as the mobile transmitter receiver 12 described above. In this regard, the stationary transmitter receivers 14 each include a spread spectrum radio circuit 24 connected to antenna 30, a data processing circuit 26 that interfaces with the radio circuit 24, and a power supply 28. The power supply 28 may be in the form of a battery(s) to facilitate relocation of the stationary transmitter receivers 14 to detect and locate underground objects in an adjacent area of interest as described in further detail below. Of course, in other embodiments, the power supply 28 need not be a battery.

The spread spectrum radio circuits 16 and 24 of the mobile and stationary transmitter receivers 12 and 14, respectively, may be transceivers that are capable of transmitting and receiving spread spectrum radio signals through the antennas 22 and 30, respectively. The data processing circuits 18 and 26 of the mobile and stationary transmitter receivers 12 and 14, respectively, group data into packets and control the spread spectrum radio circuits 16 and 24 to transmit and receive these data packets. Thus, real time digital data can be transmitted from the mobile transmitter receiver 12 to one or more of the stationary transmitter receivers 14, and vice versa.

The data processing circuits 18 and 26 also perform the timing functions necessary to determine the propagation times of the data signals from the mobile and stationary transmitter receivers 12 and 14. Furthermore, the data processing circuits 18 and 26 use the propagation times to calculate the distances between each of the stationary transmitter receivers 14 and the mobile transmitter receiver 12. The detailed description of the operation of the mobile transmitter receiver 12 with one of the stationary transmitter receivers 14 to determine the distance between the two is fully described in U.S. Pat. No. 6,067,039 to Pyner et al. which is incorporated herein by reference. The distances between the mobile transmitter receiver 12 and each of the stationary transmitter receivers 14 may be determined in the manner described in the Pyner et al. patent, and further processed by the data processing circuit 18 of the mobile transmitter receiver 12 to calculate the final location of the mobile transmitter receiver 12 in the coordinate system established by the plurality of stationary transmitter receivers 14. The distance measurements can then be displayed to the user, for example, via an LCD display. Moreover, upon obtaining numerous locations of the underground object, especially in the case where the object is an underground utility, the locations may be mapped and displayed as previously described. Of course, other radio frequency methods may be employed in other embodiments of the present invention other than as described in Pyner et al. For example, ultrawideband (UWB) radio frequency methods may be used in other embodiments.

Figure 4:
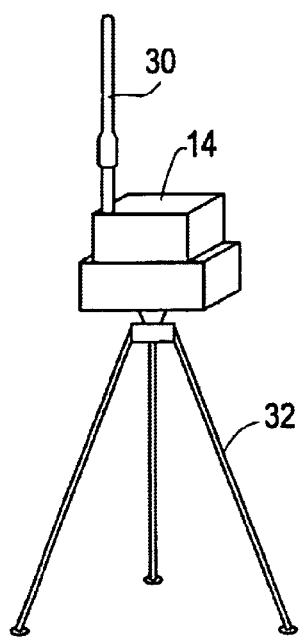
FIG. 4 shows a stationary transmitter receiver in accordance with one embodiment that is mounted on a tripod to provide a line of sight signal propagation path.

As shown in FIG. 4, the stationary transmitter receivers 14 may be mounted on a tripod 32 which raises the stationary transmitter receivers 14 above ground level. By elevating the stationary transmitter receivers 14, an unobstructed line of sight signal propagation path between the handheld mobile transmitter receiver 12 and the stationary transmitter receivers 14 can be provided. Moreover, because a local coordinate system is established, inaccuracies of GPS based systems caused by interference of tall buildings can be avoided. Thus, as described above, the system 10 for detecting and locating an underground object or objects in the embodiment of FIG. 4 has enhanced positioning capabilities to locate underground objects with accuracy of up to 10 centimeters at a range of operation of 500 meters or greater, this accuracy being attained by implementing spread spectrum radio frequency technology in a localized area via the stationary transmitter receivers 14.

To further clarify the function and advantages of the present invention, the operation of the system 10 is described herein below for detecting and locating an underground utility. In operation, the user of the system 10 first positions the plurality of stationary transmitter receivers 14 relative to the area of interest 15. As previously noted, the plurality of stationary transmitter receivers 14 are preferably portable to allow usage of the system 10 in different areas of interest. In addition, different numbers of stationary transmitter receivers 14 may be used instead of four shown in FIG. 1. The locations of each of the plurality of stationary transmitter receivers 14 relative to each other should be known. This may be attained by measuring the distance between each of the plurality of stationary transmitter receivers 14 as they are positioned. Thus, the plurality of stationary transmitter receivers 14 establish a relative coordinate system for mapping the location of the underground utility as described below.

A fixed coordinate system is then established using the relative coordinate system established by the plurality of stationary transmitter receivers 14. This may be attained in a variety of ways. For example, one or more of the plurality of stationary transmitter receivers 14 may be positioned using a GPS to fix the relative coordinate system to an absolute global position. The use of GPS in such a manner to fix the relative coordinate system does not have many of the inaccuracies previously discussed relative to applying GPS technology to monitor location of the sensor. This is because the stationary transmitter receivers 14 are stationary for a significant period of time instead of being moved about constantly in conjunction with the sensor thereby allowing GPS to determine the actual position accurately. Alternatively, one or more of the plurality of stationary transmitter receivers 14 may be positioned using conventional surveying techniques to thereby establish an fixed coordinate system. In yet another alternative, one or more of the stationary transmitter receivers 14 may be associated or otherwise tied to a fixed object proximate to the stationary transmitter receiver 14 such as a fire hydrant, man hole cover, or other immovable structure, to thereby fix the location of the relative coordinate system established by the plurality of stationary transmitter receivers 14.

Then, using the sensor 34, the user locates the underground utility within the area of interest 15 based on the indications of the sensor 34. The user can then key a start signal from the mobile transmitter receiver 12 to the stationary transmitter receivers 14 and the processor unit 38. The mobile transmitter receiver 12 sequences the stationary transmitter receivers 14, and records propagation time for each of their transmissions. A distance measurement between each of the stationary transmitter receivers and the mobile transmitter receiver 12 can then be determined based on the propagation times. Then, each of these distance measurements may be used to interpolate the location of the mobile transmitter receiver 12 in the coordinate system established in the manner described. This information may be provided to the processor unit 38 where it is stored for further processing.

The user then tracks the location of the underground utility, again using the underground sensor 34, thereby providing a plurality of presence data points and location data points, at least the location data being stored by the processor 38. By providing a plurality of location data points identifying the location of the underground utility, the underground utility is effectively mapped in the coordinate system established by the plurality of stationary transmitter receivers 14. During tracking of the underground utility across the area of interest 15, the operator may also transmit additional data received from the sensor 34, such as utility depth, to the stationary transmitter receiver 14 that is connected to the processor 38.

Once the underground utility has been tracked and mapped across the area of interest 15, the location of the underground utility can be accurately mapped and displayed by the processor 38. In addition, because the coordinate system established by the plurality of stationary transmitter receivers 14 are fixed, the location of the underground utility can be quickly determined at a later time based on the location data stored by the processor 38.

Furthermore, the user of the system 10 can move one or more of the stationary transmitter receivers 14 to an adjacent area of interest and repeat the process in the adjacent area to locate underground objects in the adjacent area. This, in effect, allows continuous mapping of the underground utility. In particular, such mapping of the underground utility in the adjacent area can be iteratively repeated as desired to provide a continuous mapping of the underground utility over a large area. Of course, it should again be noted that the method described above may be used to detect and locate any underground objects and underground utilities is merely one example of such objects. For example, location of objects such as buried containers containing explosives, chemicals, or radioactive waste can be accurately determined and mapped using the present invention. However, as can now be appreciated, the present invention is especially advantageous in detecting and locating underground utilities because they extend lengthwise across the area of interest and into adjacent areas.

In the above described manner, the present invention provides a system that can more accurately detect and locate underground objects as compared to conventional GPS based systems. It should also be evident that the system for detecting and locating underground objects of the present invention attains this accuracy in a cost effective manner while minimizing limitation of conventional GPS based systems. Moreover, the present invention also provides a novel method for detecting and locating underground objects that allow more accurate detection and location of underground objects.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

We claim:

1. A system for detecting and locating an underground object comprising:

a plurality of stationary transmitter receivers operating in a radio frequency, said plurality of stationary transmitter receivers defining a relative coordinate system for an area of interest;

a sensor adapted to detect an underground object and to provide a presence data upon detection of said underground object;

a mobile transmitter receiver operating in a radio frequency, said mobile transmitter receiver being movable with said sensor, and adapted to at least one of receive location data from and transmit location data to at least one of said plurality of stationary transmitter receivers, said location data being indicative of location of said mobile transmitter receiver in said relative coordinate system; and a global positioning system (GPS) receiver adapted to fix said relative coordinate system defined by said plurality of stationary transmitter receivers to an absolute global position.

2. The system of claim 1, further comprising a data logger adapted to record at least one of said presence data and said location data.

3. The system of claim 2, wherein said data logger is integral with said mobile transmitter receiver.

4. The system of claim 1, wherein said location data is indicative of distance between said mobile transmitter receiver and at least one of said plurality of stationary transmitter receivers.

5. The system of claim 1, further comprising a processor unit adapted to process at least one of said presence data and said location data.

6. The system of claim 5, wherein said processor unit is adapted to process said location data to generate a mapping of said underground object in said relative coordinate system.

7. The system of claim 6, wherein said processor unit includes a display device for displaying said generated mapping of said underground object.

8. The system of claim 5, wherein said processor unit is further adapted to store at least one of said presence data and said location data.

9. The system of claim 5, wherein said processor unit is connected to at least one of said mobile transmitter receiver and one of said plurality of stationary transmitter receivers.

10. The system of claim 5, wherein said processor unit is a hand held computer.

11. The system of claim 1, wherein said underground sensor is at least one of an electromagnetic, magnetic, radio frequency, radiation, metal, and chemical detection sensor.

12. The system of claim 1, wherein said radio frequency is in a range between 900 MHz to 5.8 GHz.

13. The system of claim 1, wherein said mobile transmitter receiver includes a radio circuit having a data processing circuit adapted to determine propagation times of said location data.

14. The system of claim 13, wherein said data processing circuit is further adapted to determine distance between said mobile transmitter receiver and said at least one of said plurality of stationary transmitter receivers based on said propagation times.

15. The system of claim 1, wherein said mobile transmitter receiver includes at least one battery for providing portable power to said mobile transmitter receiver.

16. The system of claim 1, wherein at least one of said stationary transmitter receivers includes a spread spectrum radio circuit having a data processing circuit adapted to determine propagation times of said location data.

17. The system of claim 16, wherein said data processing circuit is further adapted to determine distance between said at least one of said plurality of stationary transmitter receivers and said mobile transmitter receiver based on said propagation times.

18. The system of claim 1, wherein said underground object is at least one of gas, electric, telephone, fiber optics, cable, water, and sewage utility.

19. A method for detecting and locating underground object comprising the steps of:
establishing a relative coordinate system for an area of interest;
detecting an underground object and providing a presence data upon detection of said underground object;
at least one of transmitting and receiving location data in a radio frequency, said location data being indicative of location of said underground object in said established relative coordinate system;
receiving a global position system (GPS) signal indicative of an absolute global position; and
fixing said relative coordinate system to said absolute global position to establish a fixed coordinate system.

20. The method of claim 19, wherein said step of establishing a relative coordinate system includes the step of arranging a plurality of stationary transmitter receivers operating in a radio frequency proximate to said area of interest.

21. The method of claim 20, wherein said step of fixing said relative coordinate system is attained by determining global position of at least one of said plurality of stationary transmitter receivers.

22. The method of claim 20, wherein said underground object is detected using a sensor.

23. The method of claim 22, wherein said underground sensor is at least one of an electromagnetic, magnetic, and radio detection sensor.

24. The method of claim 20, further including the step of moving a mobile transmitter receiver to the location where said underground object is detected.

25. The method of claim 24, wherein said location data is indicative of distance between said mobile transmitter receiver and at least one of said plurality of stationary transmitter receivers.

26. The method of claim 24, further including the steps of determining propagation times of said location data, and determining distance between at least one of said plurality of stationary transmitter receivers and said mobile transmitter receiver based on said propagation times.

27. The method of claim 20, further comprising the step of processing at least one of said presence data and said location data to generate a mapping of said underground object in said relative coordinate system.

28. The method of claim 27, further comprising the step of displaying said generated mapping of the underground object.

29. The method of claim 20, further including the step of moving said plurality of stationary transmitter receivers to an adjacent area that is adjacent to said area of interest and establishing an adjacent relative coordinate system for said adjacent area.

30. The method of claim 29, further including the steps of detecting an adjacent underground object in said adjacent area and providing adjacent presence data upon detection of said adjacent underground object.

31. The method of claim 30, further including the step of at least one of transmitting and receiving adjacent location data in a radio frequency, said adjacent location data being indicative of location of said adjacent underground object in said established adjacent coordinate system.

32. The method of claim 19, further including the step of recording at least one of said presence data and said location data.

33. The method of claim 19, wherein said radio frequency is in a range between 900 MHz to 5.8 GHz.

34. The method of claim 19, wherein said underground object is at least one of gas, electric, telephone, fiber optics, cable, water, and sewage utility.

* * * * *